(12) United States Patent
Wexler et al.

(10) Patent No.: US 9,836,525 B2
(45) Date of Patent: Dec. 5, 2017

(54) CATEGORIZING HASH TAGS

(71) Applicant: Yahoo Holdings, Inc., Sunnyvale, CA (US)

(72) Inventors: Mike Wexler, Santa Clara, CA (US); Brian Webb, Sunnyvale, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 0 days.

(21) Appl. No.: 15/199,420

(22) Filed: Jun. 30, 2016

(65) Prior Publication Data

US 2016/0314189 A1 Oct. 27, 2016

Related U.S. Application Data

(63) Continuation of application No. 14/170,952, filed on Feb. 3, 2014, now Pat. No. 9,384,259.

(51) Int. Cl.
*G06F 17/30* (2006.01)

(52) U.S. Cl.
CPC .... *G06F 17/30598* (2013.01); *G06F 17/3033* (2013.01); *G06F 17/30321* (2013.01); *G06F 17/30345* (2013.01)

(58) Field of Classification Search
USPC ......... 707/741, 738, 740, 747; 715/273, 771
See application file for complete search history.

(56) References Cited

U.S. PATENT DOCUMENTS

| | | | | |
|---|---|---|---|---|
| 8,607,295 B2* | 12/2013 | Bhatia | ............... | H04N 21/252 725/133 |
| 9,047,315 B1 | 6/2015 | Gildfind | | |
| 2012/0054658 A1 | 3/2012 | Chuat | | |
| 2012/0254074 A1* | 10/2012 | Flinn | ............... | G06N 7/02 706/4 |
| 2013/0166568 A1 | 6/2013 | Binkert | | |
| 2013/0290337 A1 | 10/2013 | Lansford | | |
| 2014/0013223 A1 | 1/2014 | aamir | | |
| 2014/0040387 A1 | 2/2014 | Spivack | | |

OTHER PUBLICATIONS

U.S. Appl. No. 14/170,952, filed Feb. 3, 2014, Office Action, dated Oct. 20, 2015.
U.S. Appl. No. 14/170,952, filed Feb. 3, 2014, Notice of Allowance, dated Mar. 7, 2016.

* cited by examiner

*Primary Examiner* — Hung T Vy
(74) *Attorney, Agent, or Firm* — Hickman Palermo Becker Bingham LLP

(57) ABSTRACT

A content item categorizer system retrieves content items from Internet sources. If a retrieved content item includes sufficient information for traditional categorization methods, then the system assigns one or more categories to the content item using such traditional methods. The system creates a metadata model, based on information about traditionally-categorized content items, that maps at least hashtags from the content items to one or more content categories. When the system retrieves a sparse-info item that does not include sufficient information for traditional categorization, the system applies the metadata model to categorize the content item using at least hashtags in the sparse-info item. The metadata model may also include information indicating mappings between categories and coincidence of hashtags and additional content item attributes. Also, the metadata model may provide information for categorizing sparse-info items based on multiple hashtags in the sparse-info item metadata.

16 Claims, 3 Drawing Sheets

CATEGORIZING HASH TAGS

BENEFIT CLAIM

This application claims the benefit under 35 U.S.C. §120 as a continuation of application Ser. No. 14/170,952, filed Feb. 3, 2014, the entire contents of which is hereby incorporated herein by reference for all purposes as if fully set forth herein. The applicant(s) hereby rescind any disclaimer of claim scope in the parent application(s) or the prosecution history thereof and advise the USPTO that the claims in this application may be broader than any claim in the parent applications.

FIELD OF THE INVENTION

The present invention relates to categorizing content items, and more specifically, to categorizing a content item that is associated with particular hashtags based, at least in part, on categorizations of other content items with the same hashtags.

BACKGROUND

Internet content items—such as news stories, blog posts, web pages, journal articles, images, slideshows, videos, "tweets", etc.—can be collected and published in many ways. For example, personalized web portals generate personalized lists of Internet content items. A personalized web portal is a web portal that learns the preferences of each of its users and provides to each of its users content items that are likely to be of interest to the user, based on what is known about the user's preferences. As a further example, web portals can also provide lists of content items that pertain to particular topics.

Accurately categorizing Internet content items is key to creating personalized or topical lists of content items. Categorization of a content item involves assigning, to the content item, one or more content categories that relate to the information in the content item. Examples of content categories include sports, news, fashion, religion, politics, weather, etc.

The more textual information that is known about a content item, the easier it is to determine the topic(s) to which the content item relates. However, many Internet content items, referred to herein as "sparse-info items", are difficult to categorize because of the sparseness of the information given in connection with the content item. Examples of sparse-info items include short sentences (e.g. "tweets", comments, status updates), images, and videos that have little or no accompanying text. Sparse-info items frequently do not include the information that traditional categorization methods require for accurate categorization of the content items. A categorization method that is capable of better categorizing sparse-info items would be beneficial in order to include sparse-info items in applications that require categorized content items, such as personalized or topical content item lists.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
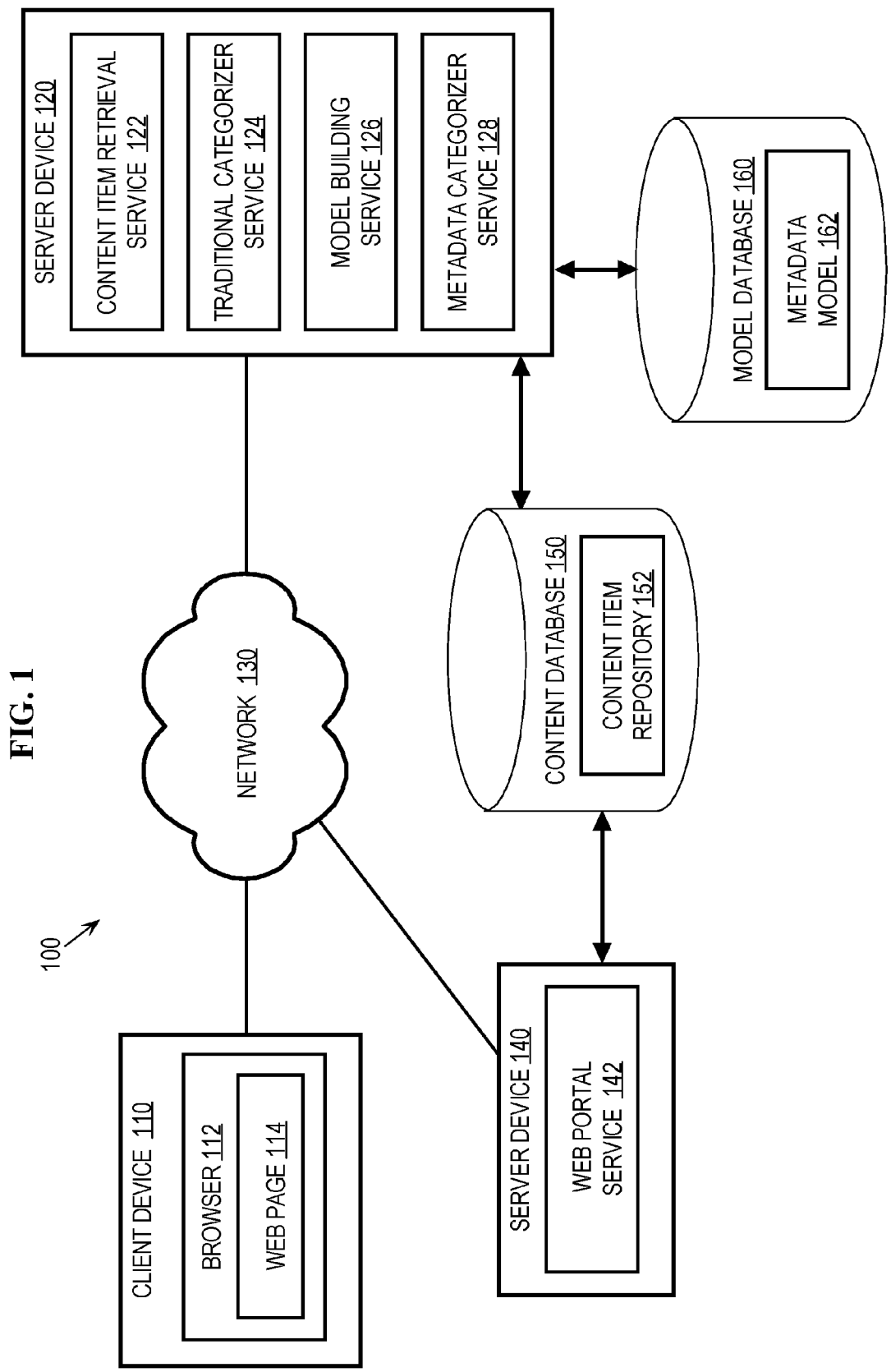
FIG. 1 is a block diagram that depicts an example network arrangement for a content item categorizer system that (a) builds a machine-learning data model that maps one or more types of metadata to content categories and (b) uses this data model to categorize content items.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A content item categorizer system retrieves content items from Internet content sources. If a retrieved content item includes sufficient information for traditional categorization methods, then the system assigns one or more categories to the content item using such traditional methods.

Hashtag metadata, referred to herein as "hashtags", consists of one or more words without delineating whitespace that are preceded by a hash symbol—e.g., #EndTheShutdown, #love, #Oscars, etc. Many times, an author includes one or more hashtags in a content item to identify one or more terms or phrases associated with the content item. For example, a user publishes, on a news feed, an editorial article about a recent government shutdown that is associated with the hashtag #EndTheShutdown. In some systems, users may also add hashtags to content items created by others.

Content items that are assigned to categories using traditional categorization methods often have corresponding hashtags. For example, an article about an upcoming Superbowl game, which has been categorized using traditional categorization methods into the category "football" may have the hashtags #Seahawks and #Broncos.

Taking these hashtags and item-to-category assignments into account, the system creates a metadata model that maps hashtags to one or more content categories. For example, because the traditional categorization method determined that the article about the Superbowl falls into the category "football", and the article has the hashtags #Seahawks and #Broncos, the system may map the hashtags #Seahawks and #Broncos to the category "football".

When the system retrieves a sparse-info item that (1) does not include sufficient information for traditional categorization, but (2) has been tagged with previously-encountered hashtags, the system applies the metadata model to categorize the content item based, at least in part, on the hashtags of the sparse-info item. For example, in the present example, an image that is associated with #Seahawks may be categorized as falling into the "football" category because the metadata model maps #Seahawks to the "football" category.

The metadata model may also include information indicating mappings between categories and coincidence of hashtags and additional content item attributes, such as source of a content item, author of a content item, etc. Also, the metadata model may provide information for categorizing sparse-info items based on multiple hashtags in the sparse-info item metadata.

Content Item Categorizer Architecture

Techniques are described hereafter for categorizing content items based at least in part on metadata, including hashtags, associated with the content items. A content item is a unit of digital information that includes one or more types of information, such as: text, images, videos, slide-shows, interactive objects, metadata, etc. FIG. 1 is a block diagram that depicts an example network arrangement 100 for a content item categorizer system that (a) builds a machine-learning data model that maps one or more types of metadata to content categories and (b) uses this data model to categorize content items.

Network arrangement 100 includes a client device 110 and server devices 120 and 140, all communicatively coupled via a network 130. Server device 120 is also communicatively coupled to a content database 150 and to a model database 160 and server device 140 is communicatively coupled to content database 150. Example network arrangement 100 may include other devices, including client devices, server devices, databases, and display devices, according to embodiments. For example, one or more of the services attributed to either of server devices 120 and 140 herein may run on other server devices that are communicatively coupled to network 130, including server devices depicted in FIG. 1 and server devices that are not depicted in FIG. 1.

Client device 110 may be implemented by any type of computing device that is communicatively connected to network 130. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a browser 112 that displays a web page 114. Browser 112 is configured to interpret and display web pages (e.g., web page 114), that are received over network 130, including Hyper Text Markup Language (HTML) pages, eXtensible Markup Language (XML) pages, etc. Client device 110 may be configured with other mechanisms, processes and functionalities, depending upon a particular implementation.

Further, client device 110 is communicatively coupled to a display device (not shown in FIG. 1), for displaying graphical user interfaces, such as a graphical user interface of web page 114. Such a display device may be implemented by any type of device capable of displaying a graphical user interface. Example implementations of a display device include a monitor, a screen, a touch screen, a projector, a light display, a display of a tablet computer, a display of a telephony device, a television, etc.

Network 130 may be implemented with any type of medium and/or mechanism that facilitates the exchange of information between client device 110 and server devices 120 and 140. Furthermore, network 130 may facilitate use of any type of communications protocol, and may be secured or unsecured, depending upon the requirements of a particular embodiment.

Server devices 120 and 140 may be implemented by any type of computing device that is capable of communicating with other devices over network 130. In network arrangement 100, server device 120 is configured with a content item retrieval service 122, a traditional categorizer service 124, a model building service 126, and a metadata categorizer service 128. In network arrangement 100, server device 140 is configured with a web portal service 142. Server devices 120 and 140 may be configured with other mechanisms, processes and functionalities, depending upon a particular implementation.

Server device 120 is communicatively coupled to content database 150 and to model database 160, and server device 140 is communicatively coupled to content database 150. Content database 150 and/or model database 160 may reside in any type of storage, including volatile and non-volatile storage (e.g., random access memory (RAM), one or more hard or floppy disks, main memory, etc.), and may be implemented by one or more logical databases. The storage on which content database 150 resides may be external or internal to server device 120 or server device 140 and the storage on which model database 160 resides may be external or internal to server device 120. Furthermore, while content database 150 and model database 160 are depicted as distinct, the databases may reside on the same device and may be managed by the same database management system or multiple database management systems.

One or more of services 122-128 and 142 may be part of a cloud computing service. Functionality attributed to one or more of these services may be performed by other services or clients depicted in network arrangement 100, according to embodiments. Services 122-128 and 142 may variously be implemented by one or more logical modules, and are described in further detail below. Any of services 122-128 and 142 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from one of the other services. Further, any of services 122-128 and 142 may send one or more of the following over network 130 to one of the other services of the system: information via HTTP, HTTPS, SMTP, etc.; XML data; SOAP messages; API calls; and other communications according to embodiments.

In an embodiment, each of the processes described in connection with one or more of services 122-128 and 142 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Categorizing Content Items

The content item categorizer system of FIG. 1 uses information from previously-categorized content items to build a machine-learning data model, i.e., metadata model 162, that maps one or more types of data for content items to content categories. As used herein, a category may be a general topic, such as "U.S. government" or "politics", or a may be a more specific topic or term, such as "Barack Obama" or "Guantanamo Bay".

Within embodiments, previously-categorized content items, from which the categorizer system (i.e., model building service 126) builds metadata model 162, have been categorized by any categorization method. For example, previously-categorized content items may have been categorized manually, or by using a traditional automated technique, or by using any other categorization technique now known or unknown. Information from any previously-categorized content item that is associated with a hashtag may be used, along with categories that have been assigned to the content item, to build metadata model 162 according to techniques described in further detail below. Herein, an embodiment in which previously-categorized content items are categorized based on traditional methods is described, which is a non-limiting example of how such previously-categorized content items may be categorized.

According to embodiments, content item retrieval service 122 of server device 120 retrieves content items, for categorizing, from one or more content item sources. Examples of content item sources include: news feeds, blogs, social networking services, web pages, web portals, information repositories, etc. According to an embodiment, content item retrieval service 122 sends information for the retrieved content item to content item repository 152 of content database 150 for storage in the repository. According to another embodiment, one of traditional categorizer service 124 or metadata categorizer service 128 sends information for a content item, once the item has been categorized, to content item repository 152 for storage in the repository.

Content item retrieval service 122 sends information for retrieved content items to traditional categorizer service 124. Traditional categorizer service 124 determines whether the retrieved content item includes enough information for traditional categorization. Traditional categorizer service 124 performs at least one traditional method of categorizing content items. Traditional categorization methods are methods of categorizing content items based on information in the content items, which include, but are not limited to: Machine-Learned Ranking (MLR) that applies a categorization system such as the Yahoo Categorization Taxonomy (YCT); Latent Dirichelt Allocation (LDA); a rule-based system; identification of information that explicitly assigns a content category to a content item; etc. Embodiments include traditional categorizer service 124 performing any kind of traditional classification that results in associating categories of content with content items.

As an example of traditional categorizer service 124 determining whether a retrieved content item includes enough information for traditional categorization, traditional categorizer service 124 determines that a particular received content item includes sufficient information for traditional categorization when the content item includes metadata that explicitly indicates one or more content categories to be associated with the content item.

As a further example, traditional categorizer service 124 determines that a particular received content item includes sufficient information for traditional categorization when the content item includes sufficient text for traditional textual analysis (e.g., via MLR). To illustrate, traditional categorizer service 124 receives information about a newspaper article that includes 30 paragraphs of newspaper-style prose. Traditional categorizer service 124 determines that the content item includes at least a threshold number of words in the text for the content item and, as such, includes sufficient information for traditional categorization.

In response to determining that a content item includes enough information for categorization, traditional categorizer service 124 performs traditional categorization analysis on the information in the content item and, based on the result of the analysis, associates the retrieved content item with one or more content categories. Specifically, traditional categorizer service 124 associates one or more categories with a content item based, at least in part, on information included in the content item other than hashtags, which is described in further detail below. For example, traditional categorizer service 124 bases a traditional categorization on one or more of the following associated with the content item: textual content of the item itself, geographic information associated with the item (e.g. GPS coordinates of where a photo was taken), author or owner of the item, the source from which the item was obtained, a time or date associated with the item, etc. There are merely examples of the virtually limitless types of information that may be available about an item.

In some cases, the information associated with an item may explicitly assign the item to a category. For example, metadata for a video may explicitly indicate that the video is of a "Western", which is a category to which videos may be assigned. In the case where traditional categorizer service 124 identifies information that explicitly assigns one or more content categories to a particular content item (e.g., in the content item metadata), traditional categorizer service 124 assigns one or more content categories to the particular content item based on the explicitly assigned one or more categories. Traditional categorizer service 124 may also perform one or more other traditional methods of categorizing such a content item, depending on the embodiment.

In some instances, analysis of a content item includes textual analysis during which traditional categorizer service 124 identifies terms in the text of a content item that correspond to one or more particular categories of content. According to an embodiment, traditional categorizer service 124 has access to lists of keywords, compiled by a human, that are associated with particular categories of content. According to an embodiment, traditional categorizer service 124 has access to a machine-learned data model that identifies keywords associated with particular categories of content.

To illustrate textual analysis, the retrieved newspaper article in the example above includes references to the terms "shutdown", "government", "Barack Obama", "Congress", and "White House". These terms are included in one or more lists of keywords associated with the content categories: "U.S. government" and "politics". Thus, traditional categorizer service 124 associates the newspaper article with the categories "U.S. government" and "politics".

According to embodiments, traditional categorizer service 124 makes the association between a content item and a content category with a calculated level of confidence (LOC). A LOC assigned by traditional categorizer service 124 indicates an estimated accuracy of the categorization association. In other words, a LOC of a categorization association indicates how likely the content item is actually about the associated content category. A LOC may be calculated in any manner, and may be represented by a percentage, by a number with any precision, by high/medium/low, by true/false, or by any other means. For example, if a content item is associated the category "politics" with a 90% level of confidence, then traditional categorizer service 124 has determined that there is a 90% chance that the content item is actually about the category "politics".

Building a Metadata-Based Machine Learning Model

The model building service 126 builds metadata model 162 based on information from content items that are classified using traditional classification methods. More specifically, model building service 126 develops metadata model 162 that maps at least hashtags, found in traditionally classified content items, to content categories.

For example, assume, as mentioned above, that a user publishes, on a news feed, an editorial article about a recent government shutdown that is associated with the hashtag

EndTheShutdown. Assume further that another user publishes, on a social media network, a link to an image (or the image itself) of a child dressed as an animal sitting outside the closed gates of the zoo accompanied by #EndTheShutdown. In this example, the article may have sufficient information to be categorized by traditional classification methods, while the image does not. In this case, the image qualifies as a sparse-info item that would be difficult to classify with an acceptable LOC (e.g., of greater than 51%) using traditional classification methods. However, if one or more of the hashtags associated with a sparse-info item is used in multiple traditionally-categorized content items, information about the traditionally-categorized content items associated with the common hashtag can aid in classifying the sparse-info item. Many sparse-info items can be classified with an acceptable LOC based on hashtags associated therewith, i.e., using metadata model 162, which includes information about mappings between hashtags and content categories that are based on traditionally-categorized data items.

Figure 2:
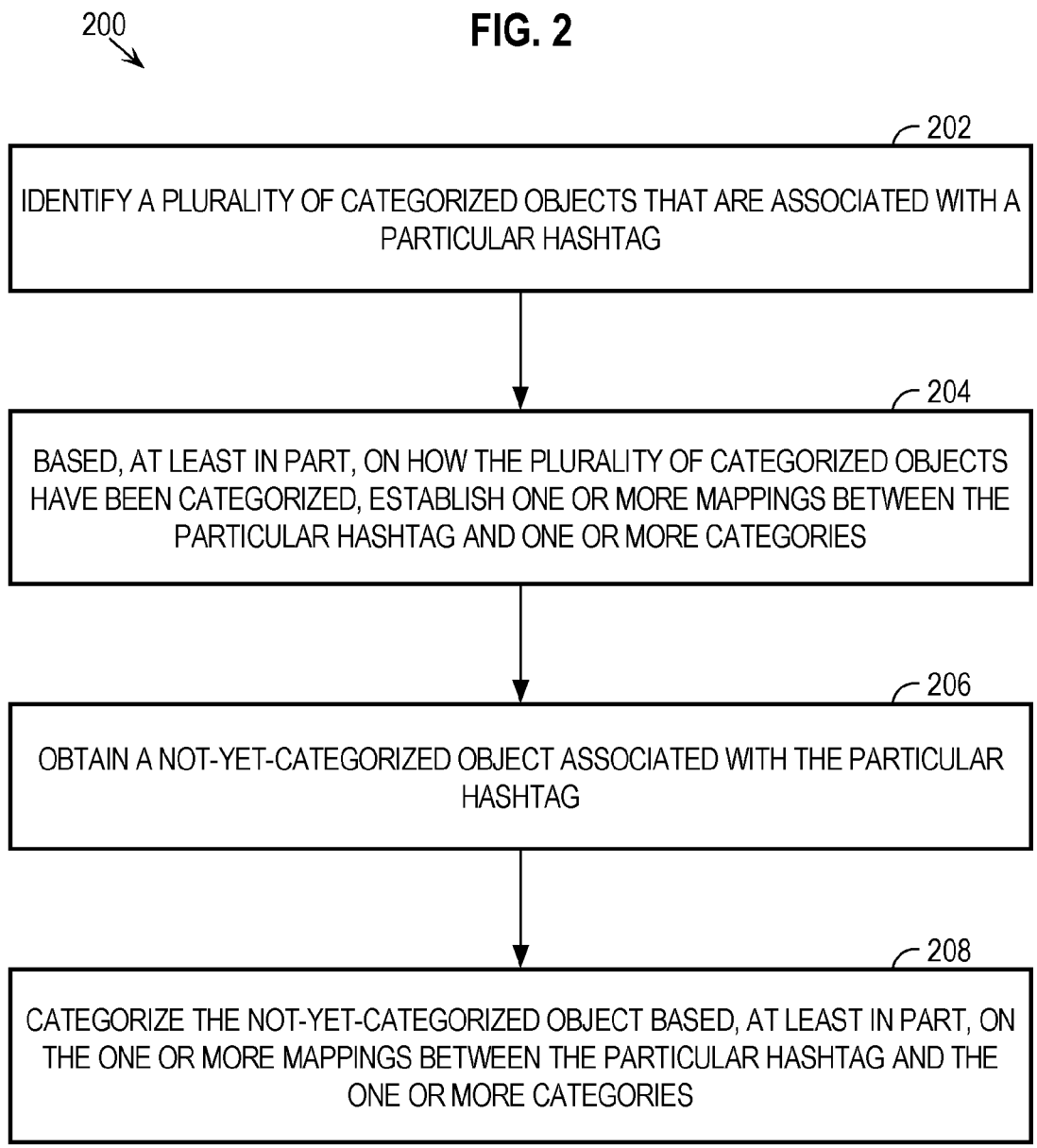
FIG. 2 depicts a flowchart 200 for building a metadata model that maps metadata to content categories and categorizing a content item based, at least in part, on the metadata model.

FIG. 2 depicts a flowchart 200 for (a) building a data model that maps metadata to content categories and (b) categorizing a content item based, at least in part, on the data model. At step 202 of flowchart 200, a plurality of categorized objects that are associated with a particular hashtag are identified. For example, traditional categorizer service 124 sends, to model building service 126, (a) information for content items associated with one or more hashtags, and (b) information for the one or more categories to which traditional categorizer service 124 assigns content items. According to an embodiment, traditional categorizer service 124 sends information about a particular content item to model building service 126 in response to traditional categorizer service 124 creating an association between the particular content item and at least one content category with at least a threshold LOC.

To illustrate, traditional categorizer service 124 sends information for the newspaper article that is associated with the hashtag #EndTheShutdown to model building service 126. Traditional categorizer service 124 also sends information for a second content item, a blog post that is associated with the hashtag #EndTheShutdown, to model building service 126.

At step 204, based, at least in part, on how the plurality of categorized objects have been categorized, one or more mappings are established between the particular hashtag and one or more categories. For example, model building service 126 includes information for received content items, such as the newspaper article and blog post associated with #EndTheShutdown, in machine-learned metadata model 162. For example, model building service 126 identifies one or more content categories with which traditional categorizer service 124 associated a content items that is received at model building service 126. Model building service 126 stores information, in metadata model 162, for one or more mappings between the one or more content categories identified for a content item and a hashtag associated with the content item.

To illustrate, with the information about the newspaper article associated with the hashtag #EndTheShutdown, model building service 126 also receives information about one or more categories with which traditional categorizer service 124 associated the newspaper article, and at what level of confidence. In this example, traditional categorizer service 124 associated the newspaper article with the content categories: "politics" at 95% LOC, and "U.S. government" at 75% LOC.

According to an embodiment, model building service 126 records in metadata model 162 how many instances of content items, out of a total number of recorded content items with a particular hashtag, were associated with particular content categories with a LOC that is above a threshold level, such as 50%. In the previous example, both of the content categories are associated with the newspaper article with a LOC that is at least 50%. Thus, in this embodiment, to record information for the newspaper article associated with #EndTheShutdown, model building service 126 increments by one the total number of content items with the hashtag #EndTheShutdown, the number of content items with that hashtag also associated with the category "politics", and the number of content items with that hashtag also associated with the category "U.S. Government". Model building service 126 would not record data for a content category associated with the newspaper article with a LOC less than the threshold level.

Thus, in this embodiment, metadata model 162 includes mappings that show a number of content items, out of all of the recorded content items with a particular hashtag, that were associated with particular content categories. To illustrate, metadata model 162 includes information for the hashtag #EndTheShutdown indicating that 100,000 content items with that hashtag were recorded, and out of those content items:

90,000 were associated with the category "politics"
    65,000 were associated with the category "U.S. government", and
    10,000 were associated with the category "Barack Obama".

According to a non-limiting embodiment, the level of confidence for a particular mapping is calculated by dividing the number of recorded content items with a hashtag that were also associated with the category by the total number of recorded content items with the hashtag. Thus, according to this embodiment, metadata model 162 indicates mappings between: the hashtag #EndTheShutdown and the category "politics" at 90% LOC, #EndTheShutdown and the category "U.S. government" at 65% LOC, and #EndTheShutdown and the category "Barack Obama" at 10% LOC.

According to an embodiment, metadata model 162 maintains, for each recorded hashtag, an ordered list of one or more categories that are mapped to the hashtag. The ordering of the list indicates relative levels of confidence among the respective mappings. For example, categories in an ordered list for a particular hashtag are organized in descending order of magnitude of LOC for the respective mappings to the hashtag. As a further example based on the information for #EndTheShutdown given above, metadata model 162 maintains an ordered list of categories mapped to #EndTheShutdown in descending order of magnitude of LOC: (1) "politics; (2) "U.S. Government"; and (3) "Barack Obama".

According to embodiments, information in metadata model 162 about content items that were published recently are more pertinent to the mapping of a particular hashtag to content categories than information about content items that were published less recently. Recency is important because the semantic meaning of particular hashtags may vary over time. In an embodiment, the value of information for a particular content item decays incrementally or continuously over time. Such incremental or continuous decay may be implemented as, e.g., linear decay, exponential decay, etc. In an embodiment, model building service 126 discards, from metadata model 162, information about a particular content item that was published more than a threshold amount of time ago, without decaying the value of the information before discarding the information ("one-time decay").

In an embodiment, model building service 126 determines the type of decay model (i.e., one or more of: incremental, continuous, linear, exponential, one-time, etc.) to apply to information for a particular hashtag. Model building service 126 bases such determination, at least in part, on one or more of: a source of the information to which decay is to be applied; analysis of how the value of a hashtag mapping decreases over time, e.g., for a particular hashtag, or for a particular source of the information, etc.; other information for a particular hashtag; etc.

According to another embodiment, model building service 126 identifies a plurality of categorized objects that are associated with a particular hashtag within content item repository 152. Specifically, traditional categorizer service 124 categorizes content items and stores information for the content items, including associated categories, in content item repository 152. When at least a threshold number of traditionally-categorized content items that are associated with a particular hashtag are stored in content item repository 152, model building service 126 establishes one or more mappings in metadata model 162 between the particular hashtag and one or more categories based on the information for the traditionally-categorized content items.

Categorizing a Sparse-Info Item

At step 206 of flowchart 200, a not-yet-categorized object associated with the particular hashtag is obtained. For example, content item retrieval service 122 retrieves a sparse-info item, such as a content item that consists of an image without text, which is associated with the hashtag #EndTheShutdown. Content item retrieval service 122 sends information for the item to traditional categorizer service 124.

According to an embodiment, traditional categorizer service 124 performs traditional categorization on any data that is available in a content item and determines that the content item does not have sufficient data for traditional categorization in response to (a) finding no data to analyze; or (b) the results of the analysis do not include a category with at least a threshold LOC. Traditional categorizer service 124 sends information for content items that do not have sufficient data for traditional categorization, and that are associated with one or more hashtags, to metadata categorizer service 128. According to an embodiment, traditional categorizer service 124 also sends the results of any analysis performed on such a content item to metadata categorizer service 128 to aid in identifying categories for the content item.

To further illustrate, traditional categorizer service 124 determines that a content item associated with a hashtag includes no information to analyze for traditional categorization and sends information for the content item to metadata categorizer service 128. As another example, traditional categorizer service 124 determines that a content item does have enough information for traditional categorization analysis and performs traditional categorization for the content item. However, traditional categorizer service 124 fails to associate the content item with any content category at a level of confidence above a particular confidence threshold (such as 50%). In this example, traditional categorizer service 124 considers this content item to be not-yet-categorized and, because the content item is also associated with a hashtag, sends information for the content item to metadata categorizer service 128. According to a further embodiment, traditional categorizer service 124 forwards information for content items associated with a hashtag that have been traditionally categorized to metadata categorizer service 128 for further categorization analysis.

At step 208, the not-yet-categorized object is categorized based, at least in part, on the one or more mappings between the particular hashtag and the one or more categories. For example, metadata categorizer service 128 receives, from traditional categorizer service 124, information for a content item consisting of an image associated with #EndTheShutdown. Metadata categorizer service 128 categorizes the received content item using metadata model 162, e.g., using MLR, to identify one or more categories for the content item based on the hashtag associated with the item. Metadata categorizer service 128 stores information for the content item, including the one or more categories identified for the item, in content item repository 152.

To illustrate, metadata model 162 indicates that the hashtag #EndTheShutdown is mapped to the content category "politics" with a 99% LOC. As such, metadata categorizer service 128 associates, with the received content item associated with #EndTheShutdown, the content category "politics" with a 99% LOC. As a further example, metadata model 162 indicates that the hashtag #EndTheShutdown is mapped to the content category "politics" with a 50% level of confidence and the same hashtag is mapped to the content category "sports" with a 50% level of confidence. According to an embodiment, metadata categorizer service 128 assigns, to the content item, the content category "politics" with a 50% LOC and also the content category "sports" with a 50% LOC.

According to an embodiment, metadata categorizer service 128 does not associate a content item with a content category when the LOC for the association is less than a given LOC threshold. For example, metadata model 162 indicates that the hashtag #EndTheShutdown is mapped to the content category "politics" with a 90% level of confidence and the same hashtag is mapped to the content category "sports" with a 40% level of confidence. Metadata categorizer service 128 determines that the category "politics" is mapped to #EndTheShutdown with an LOC greater than a threshold LOC (such as 50%) and, in response, associates the content item with the category "politics" with a 90% LOC. Metadata categorizer service 128 determines that the category "sports" is mapped to #EndTheShutdown with an LOC that is less than the threshold LOC and, in response does not associate the content item with the category "sports".

Categorization Using Additional Content Item Information

Categorization of content items is most useful when the LOC of a categorization is high, e.g., over a certain percentage such as 75% or 90%. However, mappings between categories and hashtags in metadata model 162 are not always associated with a high LOC. For example, a particular hashtag (e.g., #love) is used in many different contexts, which is reflected in the categories to which content items with the hashtag are traditionally categorized. Model building service 126 analyzes the traditionally-categorized content items associated with #love and maps #love, within metadata model 162, to 50 different content categories with no particular mapping having an LOC greater than 5%. Based on this metadata model 162, metadata categorizer service 128 associates a not-yet-categorized content item that is associated with #love with the 50 categories having levels of confidence of less than 5%. Such categorization is not useful in many use cases.

In embodiments of the invention, model building service 126 analyzes information, other than hashtags, in traditionally-categorized content items to identify information that may be used to create mappings, in metadata model 162, that have an acceptable LOC (e.g., above a certain threshold). More specifically, model building service 126 performs correlation analysis to identify information indicating trends in traditional content item categorization for content items, within a pool of content items in content item repository 152 having a particular hashtag, that also have another attribute value (other than a hashtag) in common. A content item having both a particular hashtag and a particular attribute value is referred to herein as coincidence of the particular hashtag and the particular attribute value. Examples of content item attributes other than a hashtag include: source, author, timestamp range, one or more particular keywords within the content items, etc.

According to an embodiment, model building service 126 performs correlation analysis on content item information in content item repository 152 to identify a particular value of a particular content item attribute, other than a hashtag, where a subset of content items, having a particular hashtag, are associated with the particular value of the particular content item attribute; and this subset of content items can be mapped to one or more categories with a higher LOC than all of the content items with the particular hashtag considered as a whole.

According to an embodiment, model building service 126 performs a correlation analysis for a pool of content items having a particular hashtag upon identifying satisfaction of one or more criteria, examples of which include:

LOC for a particular mapping between the hashtag and one or more categories in metadata model 162 is below a certain threshold;

There are no categorizations in metadata model 162 for a particular hashtag that come above a particular threshold;

The number of categories in metadata model 162 that are mapped to a particular hashtag exceed a particular threshold number, e.g., 2; etc.

Furthermore, model building service 126 records, in metadata model 162, mappings between one or more categories and coincidence of a particular hashtag and the particular attribute value. Such mappings may have one or more categories in common with other mappings for the particular hashtag. According to an embodiment, model building service 126 records such mappings in response to determining that the mapping between one or more categories and coincidence of a particular hashtag and the particular attribute value has a higher LOC than a mapping between the one or more categories and the particular hashtag without coincidence of other attribute values. According to an embodiment, model building service 126 records such mappings in response to determining that the LOC for the mapping between one or more categories and coincidence of a particular hashtag and the particular attribute value is above a certain LOC threshold.

To illustrate, model building service determines that, within metadata model 162, the hashtag #love has no mapping to a category with more than a threshold LOC of 50%, which satisfies criteria for performing a correlation analysis. In response to this determination, model building service 126 performs a correlation analysis of content items with the hashtag #love stored in content item repository 152. As a result of the correlation analysis, model building service 126 determines that, when content items are associated with #love and are from a particular author "fashionista123", the content item are be mapped to the content category "fashion" with a 95% LOC, which is above the threshold LOC. As such, model building service 126 records, in metadata model 162, a mapping between the content category "fashion" and coincidence of the hashtag #love and the author attribute value of "fashionista123" with an LOC of 95%.

As a further illustration, through the correlation analysis, model building service 126 also determines that content items with the hashtag #love that were published after a certain timestamp are associated with the content category "Love TV" with an LOC of 85%. Because the LOC of the association between "Love TV" and the coincidence of #love and a timestamp that indicates publication of the content item after a particular historical timestamp of is above the LOC threshold of 50%, model building service 126 records a mapping, within metadata model 162, between the category "Love TV" and coincidence of #love and timestamps after the indicated historical timestamp with the LOC of 85%. Any kind of timeframe may be included in a mapping in metadata model 162.

Metadata categorizer service 128 uses mappings between categories and the coincidence of hashtags and other content item information, as described above, to assign categories to not-yet-categorized content items. For example, metadata categorizer service 128 receives a not-yet-categorized content item that is associated with #love. Metadata categorizer service 128 determines that the author of the content item is not "fashionista123", but that the content item was published after the historical timestamp indicated in the mapping between the category "Love TV" and coincidence of #love and the historical timestamp. As such, metadata categorizer service 128 at least associates the content item with the category "Love TV" with the indicated LOC of 85%.

According to an embodiment, metadata categorizer service 128 applies the highest possible LOC to a categorization of a content item with a particular category. For example, metadata model 162 includes a mapping between #love and "Love TV" with an LOC of 5% and also includes a mapping between the category "Love TV" and coincidence of #love and timestamps after the indicated historical timestamp with the LOC of 85%. Metadata categorizer service 128 receives a not-yet categorized content item associated with #love and published after the historical timestamp. Based on the mappings for which the content item is qualified, metadata categorizer service 128 associates the content item with the category "Love TV" with an LOC of 85%, which is the highest LOC available for the association given the mappings in metadata model 162.

According to embodiments, metadata categorizer service 128 receives, from traditional categorizer service 124, information about results of a traditional categorization of a content item. If applicable, metadata categorizer service 128 uses this traditional analysis information to adjust the level of confidence of a content category identified, by metadata categorizer service 128, for the content item. For example, metadata categorizer service 128 determines that a content item is associated with the content category "politics" with a 70% LOC. Metadata categorizer service 128 receives information, from traditional categorizer service 124, that the category "politics" was identified by traditional categorization methods for the content item with a 25% LOC.

Within embodiments, metadata categorizer service 128 may combine confidence levels from the various categorizers by any method. Specifically, according to an embodiment, metadata categorizer service 128 increases the LOC for the category "politics" because the independent analysis by traditional categorizer service 124 independently confirms, at least in part, the association of "politics" with the content item. According to an embodiment, metadata categorizer service 128 categorizes the subject content item with the highest LOC of the categorizations resulting from the various categorization methods. According to an embodiment, metadata categorizer service 128 trains an MLR given a set of outputs from various classifiers and a golden set until the MLR learns how the LOC should be determined for various combinations of input.

Related Categories

Model building service 126 may also identify related categories in mappings for a particular hashtag stored at metadata model 162 and create composite mappings that are of greater LOC than the mappings for the un-combined related categories. For example, the categories "sports", "baseball", and "football" are all related to the category "sports". As another example, the categories "baseball", "Alex Rodriguez", and "Dodger Stadium" are all related to the category "baseball".

To identify related categories in mappings for a particular hashtag, model building service 126 identifies a subset of a pool of categorized objects, in content item repository 152, that are associated with a first category of a plurality of related categories. For example, content item repository 152 includes 100,000 content items associated with the hashtag #winner. Model building service 126 identifies a subset of 22,000 categorized objects, within content item repository 152 associated with the hashtag #winner, that are associated with the category "baseball" (i.e., with an LOC of 22%). Further, model building service 126 identifies a second subset of a pool of categorized objects, in content item repository 152, that are associated with a second category of the plurality of related categories. For example, model building service 126 identifies a second subset of 30,000 categorized objects, within content item repository 152 associated with the hashtag #winner, that are associated with the category "football" (i.e., with an LOC of 30%).

If there is at least one content item in the first subset of categorized objects that is not in the second subset of categorized objects, then model building service 126 can combine the information for the two subsets of categorized objects and create a composite mapping that maps the hashtag with a category to which the categories of the two subsets are related. For example, the subset of content items associated with #winner that are also associated with the category "baseball" and the subset of content items associated with #winner" that are also associated with the category "football" have no content items in common. Model building service 126 combines the statistics for the two subsets of content items and creates a composite mapping between the category "sports" (to which both "baseball" and "football" are related) and the hashtag #winner with an LOC of 52%. The LOC of such a composite mapping may be calculate by any manner of calculating levels of confidence.

Categorizing Content Items Associated with Multiple Hashtags

Many times, content items are associated with multiple hashtags. Metadata categorizer service 128 can use the information in metadata model 162 for each hashtag associated with a particular content item to help categorize the content item. To illustrate, metadata categorizer service 128 receives information for a content item associated with the hashtags #EndTheShutdown and #Democrats. Metadata model 162 includes at least one mapping for each of the hashtags associated with the received content item. Metadata categorizer service 128 determines that #EndTheShutdown is associated with the category "politics" at an LOC of 90% within metadata model 162, and that # Democrats is associated with the category "politics" at an LOC of 85% within metadata model 162. In response, metadata categorizer service 128 associates the content item with the category "politics", e.g., at an LOC of 90%.

The LOC of a mapping may be calculated by one or more of:
- A rules-based system (e.g., use the average of all LOCs of applicable mappings, use the highest of all LOCs of applicable mappings, etc.);
- A machine-learning system that is trained by updating a machine learning classifier; or
- Any other way of calculating applicable LOCs.

As a further example, model building service 126 determines that at least two of the multiple hashtags for a particular content item are associated with categories, respectively, that are related. Metadata categorizer service 128 associates the content item with a content category based, at least in part, on a composite mapping created from mappings of the related content items. For example, metadata categorizer service 128 receives a particular content item associated with both #homerun and #touchdown. Within metadata model 162, the hashtag #homerun is associated with the category "baseball" and the hashtag #touchdown is associated with the category "football". From content analysis, e.g., performed by model building service 126, metadata model 162 includes information that the categories "baseball" and "football" are both associated with the category "sports". Such information in metadata model 162 indicates that "baseball" is a related category to "sports" and that "football" is a related category to "sports". From the information in metadata model 162, metadata categorizer service 128 infers that the received content item can be categorized as "sports". According to an embodiment, metadata categorizer service 128 assigns, to the categorization of the content item with "sports", a higher LOC than a categorization of the content item with either of the categories "baseball" or "football" since the content item is associated with two, somewhat independent, indicators that the item is about "sports" (i.e., #homerun and #touchdown).

Furthermore, according to an embodiment, model building service 126 maps the coincidence of multiple hashtags with one or more content categories. For example, model building service 126 receives information for a traditionally-categorized content item that is mapped to two or more hashtags, which is a coincidence of the two or more hashtags. Model building service 126 records an association, within metadata model 162, between coincidence of the two or more hashtags, or a subset thereof having at least two hashtags, and a particular category with which the received content item is associated.

As a more specific illustration, model building service 126 receives information for a content item that is mapped to both #EndTheShutdown and #love, which, through traditional categorization, is associated with the content category "politics". Model building service 126 records information for a mapping between coincidence of #EndTheShutdown and #love and the category "politics". Metadata categorizer service 128 receives a not-yet-categorized content item that is associated with both #EndTheShutdown and #love. Metadata categorizer service 128 associates the content item with the category "politics" based, at least in part, on the mapping between coincidence of #EndTheShutdown and #love and the category "politics". The LOC for this association is calculated as indicated above.

According to an embodiment, metadata categorizer service 128 applies a mapping that maps the coincidence of multiple hashtags to categorize a not-yet-categorized content item when the mapping of the coincidence of multiple hashtags results in a better LOC than a categorization for the content item that is based on mappings for single hashtags within metadata model 162. According to an embodiment, metadata categorizer service 128 categorizes a content item based on mappings for single hashtags within metadata model 162 and then adjusts the LOC of the association based on the mapping of the coincidence of multiple hashtags of the content item.

Use Cases

Categorization of a content item may be used in a variety of ways. To illustrate, browser 112 on client device 110 requests a web page, which represents a web portal application, from web portal service 142. In response to the request, web portal service 142 sends information for the requested web page (i.e., web page 114) to browser 112. Browser 112 interprets the information for web page 114 and causes a graphical user interface of the web page to be displayed at a display device for client device 110.

The web portal application represented in web page 114 displays categorized content items, e.g., in lists of content items organized by topic or category. The web portal application includes a content item in a particular list when the content item is associated with one or more categories, for the particular list, with at least a threshold LOC (such as 90%).

The web portal application also displays categorized content items in a personalized content item list. The web portal application includes a content item in the personalized content item list when the content item is associated with one or more categories, with at least a threshold LOC (such as 75%), in which the target user has shown interest.

Furthermore, when a user clicks on or spends time on a particular content item, the web portal application can use this information to determine the interests of the user. Specifically, the web portal application may record that the user has interest in categories associated with a content item in which a user has expressed interest. For example, the web portal application combines the categories with which such a content item is associated, and at what levels of confidence, with the duration of time spent on the article and other indications of interest to determine a probability that the user is interested in the indicated content categories.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
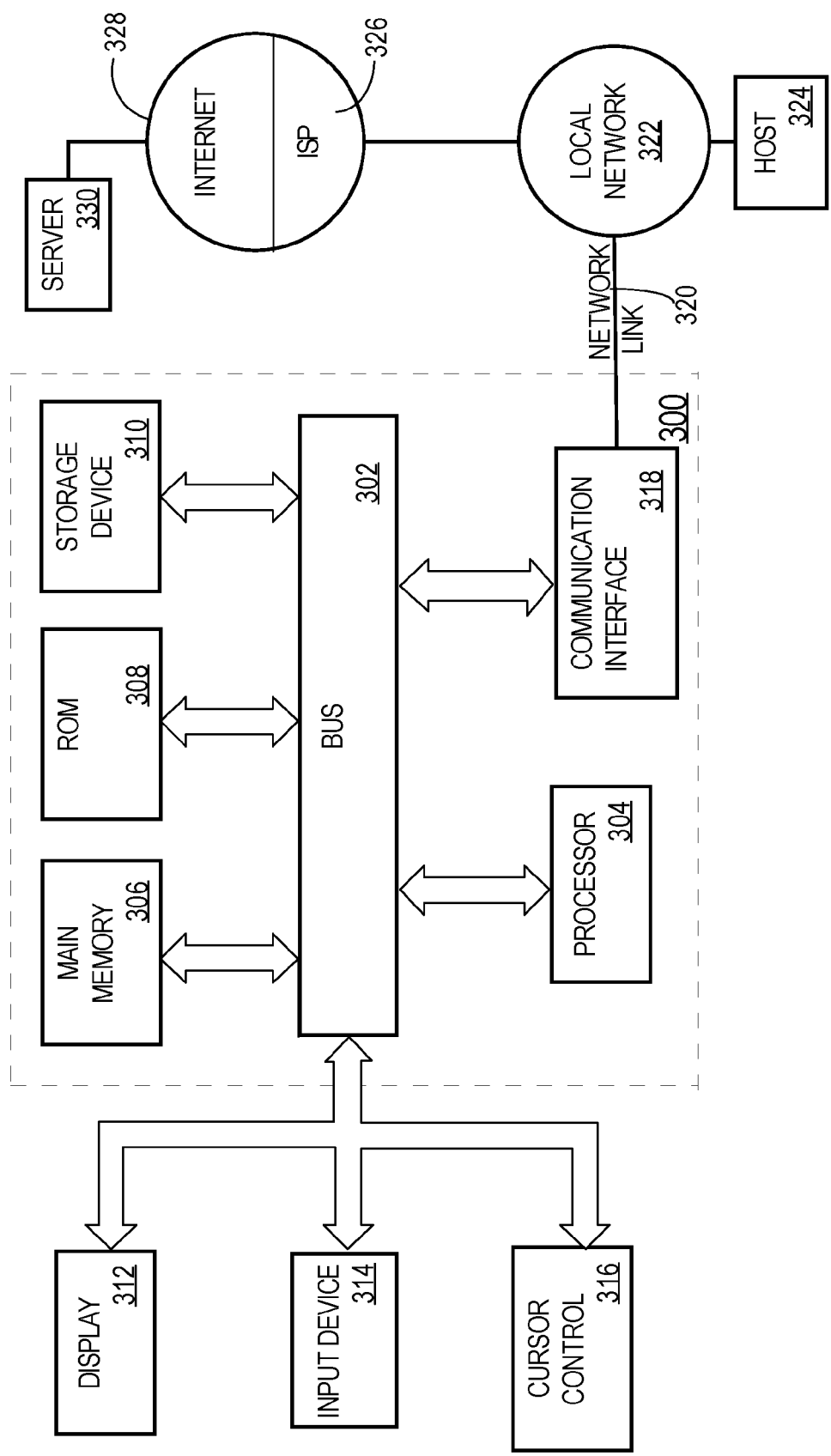
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for categorizing not-yet categorized objects from internet content sources, comprising:
    identifying, by a server device that comprises memory, non-transitory storage, and one or more processors, a plurality of categorized objects that are associated with a particular hashtag;
    based, at least in part, on how the plurality of categorized objects have been categorized, the server device, generating plurality of hashtag-to-category mappings that map the particular hashtag to a plurality of categories;
    wherein each hashtag-to-category mapping of the plurality of hashtag-to-category mappings maps the particular hashtag to a corresponding category of the plurality of categories;
    the server device, generating an ordered list of the plurality of hashtag-to-category mappings;
    the server device, obtaining a not-yet-categorized object that is associated with the particular hashtag; and
    the server device, categorizing the not-yet-categorized object based, at least in part, on the ordered list of the plurality of hashtag-to-category mappings.

2. The method of claim 1 wherein:
    generating a plurality of hashtag-to-category mappings includes generating a particular hashtag-to-category mapping based on a particular categorized object of the plurality of categorized objects;
    the particular categorized object is associated with a value; and
    within the ordered list, the particular hashtag-to-category mapping has a position that is based on the value associated with the particular categorized object.

3. The method of claim 2, wherein the value associated the particular categorized object is an information value that decays over time based upon recency of publication date of the particular categorized object.

4. The method of claim 3, wherein decay of the information value is an incremental decay model of the value based upon specified time duration thresholds.

5. The method of claim 3, wherein decay of the information value is a continuous decay model, where the value associated each categorized object continuously decays based upon duration of time since the publication date of the categorized object.

6. The method of claim 3, wherein decay of the information value is an exponential decay model, where the value associated each categorized object decays at an exponential rate based upon duration of time since the publication date of the categorized object.

7. The method of claim 3, wherein decay of the information value is a one-time decay model of the value based upon a specific time duration threshold, where the value associated each categorized object decreases once the publication date of the particular categorized object exceeds the specified time duration threshold.

8. The method of claim 2, wherein the value associated with the particular categorized object is a hashtag value that decays over time based upon recency an associated hashtag to the particular categorized object.

9. A non-transitory computer-readable medium that stores instructions which, when executed by one or more processors, cause performance of a method for categorizing not-yet categorized objects from internet content sources comprising:

a server device, identifying a plurality of categorized objects that are associated with a particular hashtag;

based, at least in part, on how the plurality of categorized objects have been categorized, the server device, generating plurality of hashtag-to-category mappings that map the particular hashtag to a plurality of categories;

wherein each hashtag-to-category mapping of the plurality of hashtag-to-category mappings maps the particular hashtag to a corresponding category of the plurality of categories;

the server device, generating an ordered list of the plurality of hashtag-to-category mappings;

the server device, obtaining a not-yet-categorized object that is associated with the particular hashtag; and the server device, categorizing the not-yet-categorized object based, at least in part, on the ordered list of the plurality of hashtag-to-category mappings.

10. The non-transitory computer-readable medium of claim 9, wherein:

generating a plurality of hashtag-to-category mappings includes generating a particular hashtag-to-category mapping based on a particular categorized object of the plurality of categorized objects;

the particular categorized object is associated with a value; and within the ordered list, the particular hashtag-to-category mapping has a position that is based on the value associated with the particular categorized object.

11. The non-transitory computer-readable medium of claim 10, wherein the value associated the particular categorized object is an information value that decays over time based upon recency of publication date of the particular categorized object.

12. The non-transitory computer-readable medium of claim 11, wherein decay of the information value is an incremental decay model of the value based upon specified time duration thresholds.

13. The non-transitory computer-readable medium of claim 11, wherein decay of the information value is a continuous decay model, where the value associated each categorized object continuously decays based upon duration of time since the publication date of the categorized object.

14. The non-transitory computer-readable medium of claim 11, wherein decay of the information value is an exponential decay model, where the value associated each categorized object decays at an exponential rate based upon duration of time since the publication date of the categorized object.

15. The non-transitory computer-readable medium of claim 11, wherein decay of the information value is a one-time decay model of the value based upon a specific time duration threshold, where the value associated each categorized object decreases once the publication date of the particular categorized object exceeds the specified time duration threshold.

16. The non-transitory computer-readable medium of claim 10, wherein the value associated with the particular categorized object is a hashtag value that decays over time based upon recency an associated hashtag to the particular categorized object.

* * * * *